Jan. 9, 1934.　　　W. H. HARSTICK　　　1,943,071
POWER TRANSMISSION MECHANISM
Filed May 2, 1929　　　3 Sheets-Sheet 1

FIG. I.

INVENTOR
WILLIAM H. HARSTICK
BY
ATTORNEY

Jan. 9, 1934.  W. H. HARSTICK  1,943,071
POWER TRANSMISSION MECHANISM
Filed May 2, 1929     3 Sheets-Sheet 2

INVENTOR
WILLIAM H. HARSTICK
BY
Ray M Eilers
ATTORNEY

Jan. 9, 1934.  W. H. HARSTICK  1,943,071
POWER TRANSMISSION MECHANISM
Filed May 2, 1929  3 Sheets-Sheet 3

INVENTOR
WILLIAM H. HARSTICK
BY
Ray M Eiler
ATTORNEY

Patented Jan. 9, 1934

1,943,071

UNITED STATES PATENT OFFICE 1,943,071

POWER TRANSMISSION MECHANISM

William H. Harstick, Beloit, Wis., assignor to Fairbanks, Morse & Co., Chicago, Ill., a corporation of Illinois Application May 2, 1929. Serial No. 359,777

14 Claims. (Cl. 184—4)

This invention relates to improvements in power transmission mechanism, and particularly to improved lubricating means for use in connection with related rotating and reciprocating parts.

An object of the present invention is to provide an improved power transmission mechanism, or power head, in which is embodied means for elevating and conveying lubricant from any suitable supply source, to all movable and wearing parts of the mechanism.

A further object is an improved provision for utilizing a normal rotary movement of the driving means, to effect an automatic force lubrication of wearing parts, and to attain this result without the use of additional or expensive mechanism.

An additional object is to provide an improved power transmission mechanism, which is simple and reliable in operation, and is economical to construct and maintain.

Figure 1:
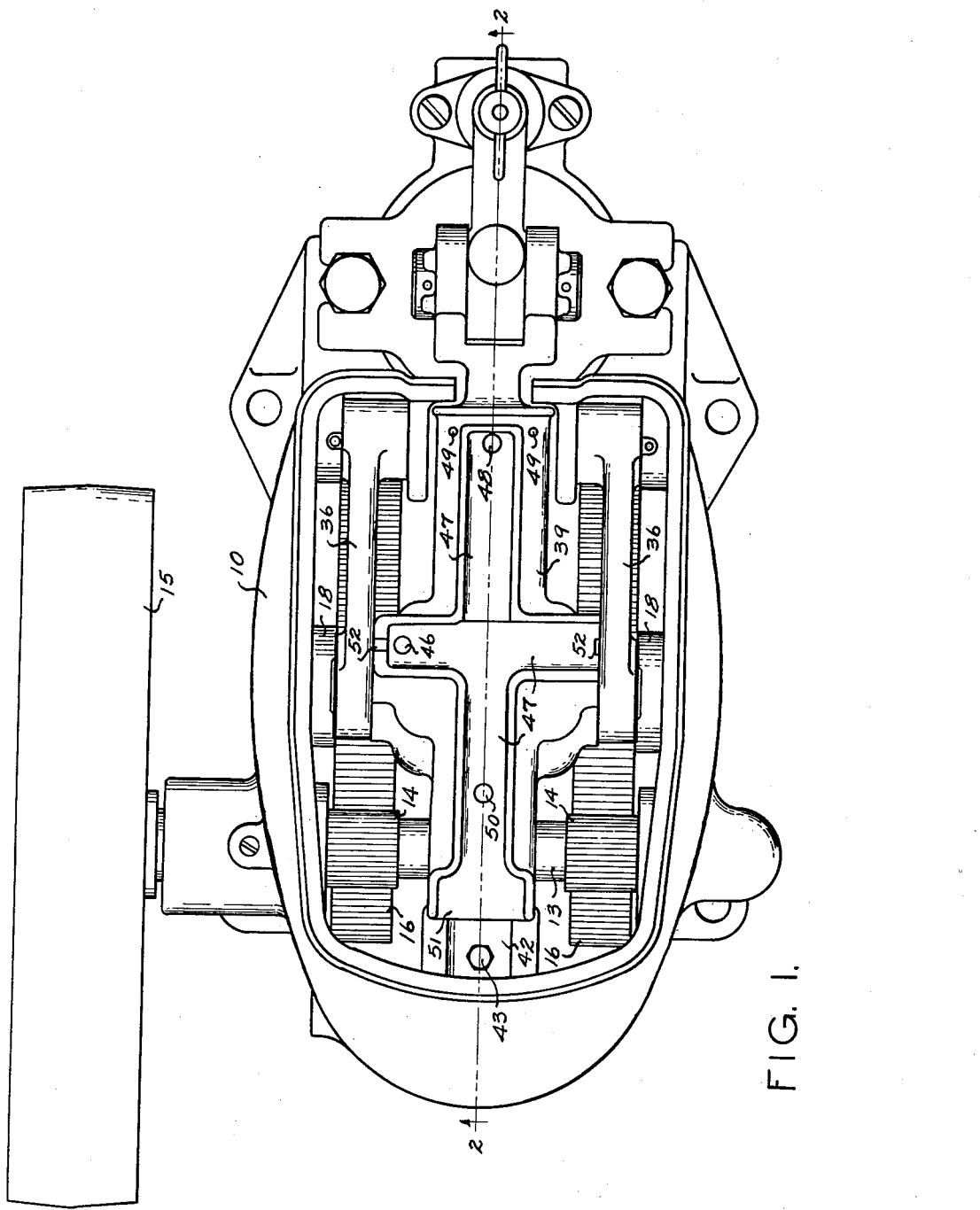
Figure 2:
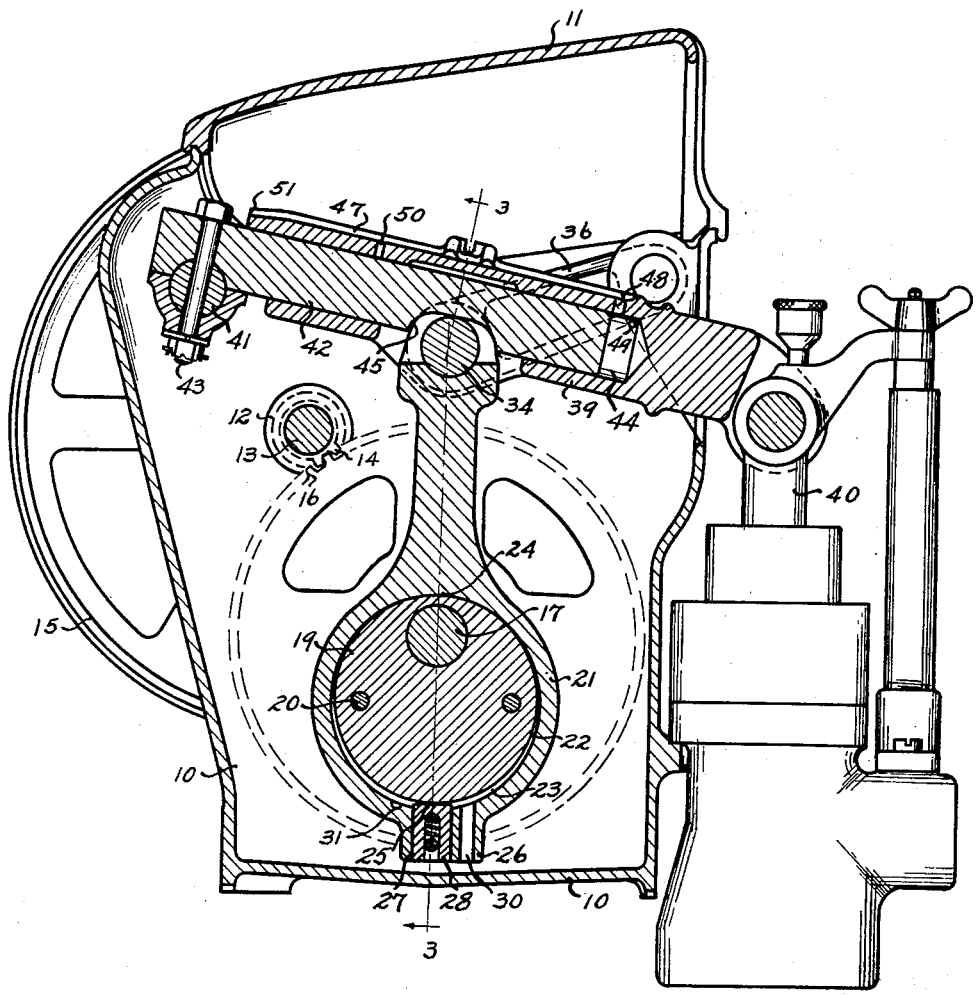
Figure 3:
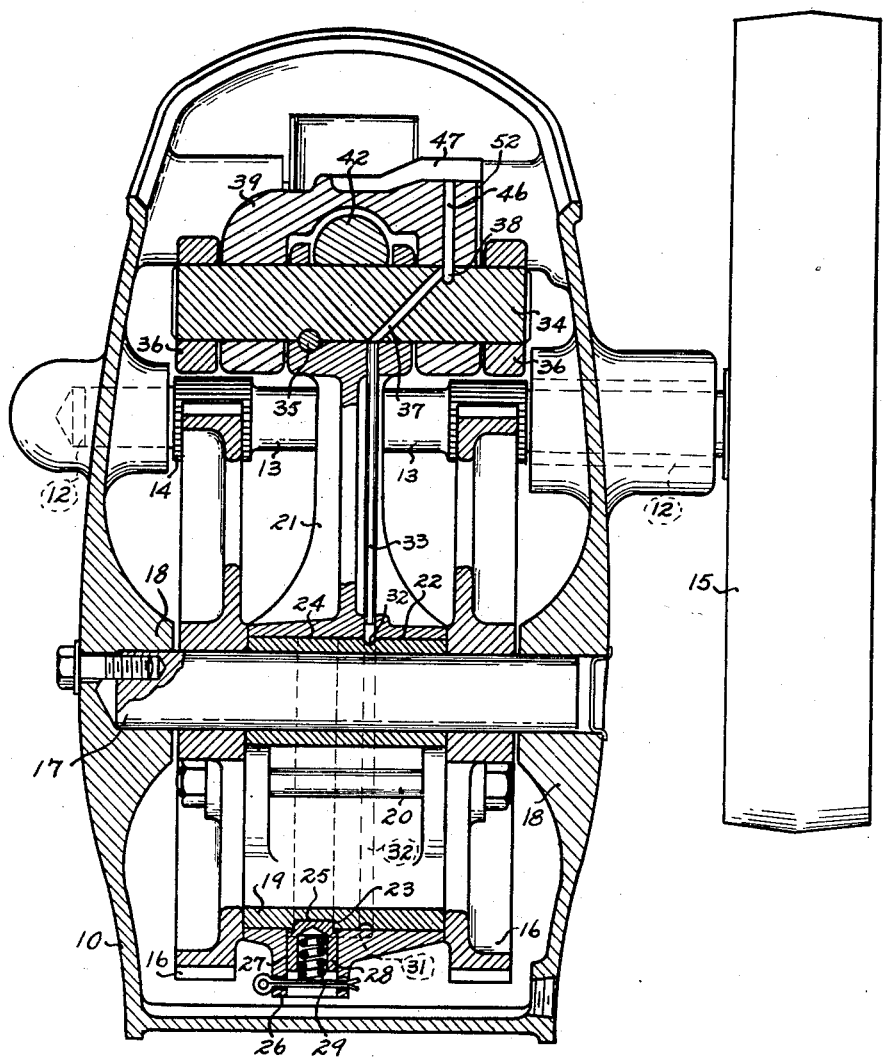

Further objects and advantages will appear from the following detailed description of parts and the accompanying drawings, in which Fig. 1 is a top or plan view of a preferred form of the device; with the cover removed for clearness; Fig. 2 is a sectional elevation taken along line 2—2 of Fig. 1, and Fig. 3 is a sectional elevation taken along the line 3—3 of Fig. 2.

It will, of course, be understood that the present detailed description of parts and the accompanying drawings relate to a single preferred executional embodiment of the invention, and that substantial changes may be made in the described construction and arrangement of parts, without departing from the spirit and full intended scope of the disclosure as defined by the appended claims.

Referring by numerals to the drawings, 10 designates a casing, which is, by preference, of cast or other construction suitable to serve as a base and support for the assembly. A cover 11 is provided for the casing to prevent dust from entering the enclosure, and to provide, with the base 10, a closed reservoir or container for a quantity of oil. The base 10 includes bearings 12, for supporting a drive shaft 13 which, by preference, is provided with pinion gears 14. Since it is desirable to retain and return the surplus oil from the bearings to the reservoir, it is necessary to avoid openings through which oil might escape. To this end, at least one of the bearings 12 may be formed as an exteriorly closed boss, in such a manner that oil leakage is prevented. Upon an exteriorly extended portion of the shaft 13, a power pulley 15 is keyed. Instead of providing for belted drive of the shaft 13, any other suitable driving means may be used to attain the same purpose.

In driven relation with the pinion gears 14 are meshed gears 16, which are loosely mounted on a shaft 17 fixedly supported in bearings 18 formed in the casing 10. The bearings for this shaft are so arranged and constructed that oil leakage is prevented. Eccentrically and loosely mounted on the shaft 17, is a member 19, which is, by preference, formed as a cylinder, and which is kept in driven relation wlith the gears 16 by means of bolts 20, or the equivalent. These bolts securely fasten the member 19 to the gears 16, although it will be understood that any other suitable driving means may be used. An eccentric strap or rod 21 is rotatably mounted upon the outer cylindrical surface 22 of the member 19, and is, by preference, formed without the usual removable cap portions at the crank end, in order to provide a running fit upon the member 19, and to prevent oil leakage between these members. On the surface 22 of the member 19, an eccentric groove 23 is formed, (Fig. 2), which is so arranged in relation to the member 19, that a portion 24 of the groove is substantially tangent with the surface 22. From this portion, the depth of the groove is increased uniformly to a portion 25, which is, by preference, diametrically opposite to the portion 24. At the point 25 the greatest depth of the groove exists.

The crank-end of the rod 21 includes, by preference, a projecting base 26, which is arranged at the lowest portion of the rod so as to extend or dip into the oil contained within the casing. In a portion of this base, a bore 27 is provided, in which operates a spring-pressed plunger 28, or the equivalent. This plunger extends inwardly to engage the groove 23, the groove-engaging portion of the plunger being flattened, so as to make a running fit with the sides of the groove. Further, the portion of the plunger riding in the groove 23, is maintained in contact with the surfaces of the groove, at all times, by means of a spring 29, or the equivalent. By way of briefly referring to the action of the plunger and groove, it will be seen that, as the gears 16 are rotated, the member 19 is rotated relative to the rod 21, whereby a certain volume of fluid is displaced in the groove 23 between the member 19 and the rod. This displacement may be utilized to pump a liquid, if suitable inlet and outlet openings are provided.

An inlet opening 30 is provided in the base 26, and is disposed centrally of the groove 23, thereby insuring direct communication of the lubricant between the reservoir and the groove. When the member 19 is rotated to a position where the portion 24 is adjacent the opening 30, the inward flow of oil is interrupted, but prior to this position, oil is drawn into the groove 23. When the portion 24 passes the opening 30, it will trap a certain quantity of oil in the groove, and carry it around to a cross-groove outlet passage 31 formed in the rod 21. It will be readily seen that the plunger 28 serves as a wall to prevent direct communication between the inlet and outlet opening, and insures displacement of the oil carried within the groove, as the members 19 and 21 are relatively rotated. The passage 31 provides communication between the groove 23 and an annular groove 32 of uniform depth, formed, preferably, as part of the member 19, and upon the surface 22. By the above described arrangement of parts, the oil is forced through diametrically opposite portions of the groove 32 into a tube 33 which is in communication with the groove. This tube may be either removable from, or formed integrally with, the rod 21. It will be evident that the above described arrangement provides means for automatically supplying and conveying oil for certain of the parts within the enclosure.

The upper end of the rod 21 is fixedly related to a pin 34 by means of a removable stud 35, or the equivalent. Operatively related to the pin 34, are guide links 36 which are pivotally supported at their opposite ends, in suitable bearings in a stationary portion of the casing 10. It will be apparent that the path of travel of the pin 34 and its related parts is determined by the movement of the links 36, and further that this path of travel is substantially arcuate in form, being defined by the radius of the link members.

The pin 34 is associated with a continuation of the lubricant conducting system, since a passage 37 is formed through the pin for communication, at one end, with the tube 33; the other extremity of the passage being in communication with a duct 38 formed transversely of the pin 34, this duct being of appreciable length and substantially arcuate form, for a purpose hereinafter appearing.

Pivotally mounted upon the pin 34 is a walking beam 39, which is operatively related at one end to a pump rod 40, or the like, to which it transfers its movement. The other end of the beam 39 is indirectly related to a pin 41, which is rotatably supported in bearings formed in the casing 10. This pin is fixedly secured to a plunger 42 by means of a bolt 43 or the equivalent. The plunger 42 is slidably associated with a longitudinal bore 44 provided in the beam 39. By this telescopic arrangement of the plunger and walking beam, provision is made to compensate for the necessary endwise motion of the beam 39, in order to insure a substantially rectilinear motion of the driven pump rod 40. In order to permit the beam 39 to slide freely upon the plunger, a portion 45 of the plunger is slotted about the pin 34, and permits relative movement between the plunger and pin. Further, by this telescopic arrangement of the plunger and walking beam, provision is made for supplying lubricant to certain of the parts, as will hereinafter appear.

It will be apparent that the walking beam has a pivoted movement about the pin 34, and that to insure oil communication between the duct 38 and a passage 46, the duct 38 is formed of substantial length across the passage 46. The oil is thus conveyed to and through the passage 46 to a trough 47, which is formed, by preference, integrally with the walking beam, 39. This trough serves as an oil reservoir and distributing means for the lubrication of various parts which are arranged to be supplied with oil therefrom. Due to the indirect connection of the beam to the pin 41, the beam moves, as a radius of varying length, about this pin as its center. This movement is utilized to supply lubricant by gravity to various conveying passages. For instance, in certain positions of the beam and trough, oil will flow by gravity through a passage 48, which is in communication with the interior of the bore 44. It will be apparent that the plunger 42 serves, at certain times, to close one extremity of the passage 48, and by further movement inwardly, tends to force oil trapped within the bore, out through discharge openings 49, which are so positioned as to direct a stream of oil upon the pins supporting the guide links 36, and thus copiously lubricating these parts.

The plunger 42 is lubricated by means of a passage 50 formed in the beam, which is, at times, supplied with oil by gravity from the trough 47. In like manner, the pin 41 is lubricated as the oil flows beyond an open end 51 of the trough 47. Through a passage 52 formed in the walking beam, and in communication with the trough 47, oil flows by gravity to lubricate the pin 34.

A number of advantages will be apparent from the constructional features of the parts above described. In this device it will be evident that all the movable and wearing parts of the assembly contained within the closed casing, are completely and copiously lubricated by means of a simple and reliable arrangement of the various parts. It will be seen that the preferred arrangement utilizes only the necessary operating parts of the assembly to attain full automatic lubrication, without the use of additional and expensive parts. Therefore it will be apparent that the present improvements utilize completely a limited amount of available space, and attain all of the added advantages incident to full automatic oiling.

It will be seen that the described telescopic arrangement of the walking beam, attains not only a substantially rectilinear movement of the pump rod or its equivalent, but that the same means is utilized to convey oil to certain parts to be lubricated.

From the above description of a preferred form of the device, it will be apparent that the parts thereof are of a sufficiently rugged design to withstand the uses to which devices of this general type are usually applied.

I claim as my invention:

1. In a power head, a rotatable driving member, means for translating the rotary movement of said member into a reciprocating movement, said means including a walking beam comprising a plurality of elements, one of said elements forming a fluid displacement chamber and another of said elements adapted to displace a fluid from said chamber.

2. In a power head, a rotatable driving member, means for translating the rotary movement of said member into a reciprocating movement, said means including a beam member, means carried by said beam member forming a lubricant reservoir, a rotary pump associated with said driving member for supplying lubricant to said reservoir, a lubricant chamber adapted to communicate with said reservoir, and a plunger operable in said chamber, upon movement of said beam member, and adapted for displacing lubricant from said chamber.

3. In a power head, a rotatable driving member, means for translating the rotary movement of said member into a reciprocating movement, said means including a beam member, said beam member forming a lubricant reservoir and a lubricant pump adapted to be supplied from said reservoir; and means for supplying a lubricant to said reservoir.

4. In a power head, a rotatable driving member, means for translating the rotary movement of said member into a reciprocating movement, said means including an eccentric, a strap for said eccentric, said eccentric and strap forming a fluid displacement chamber therebetween, a rocker associated with said translating means, means for conducting fluid from said chamber to said rocker, and means carried by the rocker for further displacing the fluid delivered thereto.

5. In a power head, power transmitting mechanism including an actuating beam member comprising a reservoir for lubricant, said member being provided with an internal bore in communication with said reservoir, a plunger slidably engaging said bore, whereby the normal movement of said beam member tends to force oil from said bore to parts of the mechanism to be lubricated.

6. In a power head, power transmitting mechanism including an actuating member forming a reservoir for lubricant, and a lubricant displacement chamber, adapted for connection with the reservoir, a plunger slidably disposed in said chamber, and lubricant conducting means whereby movement of said plunger tends to force lubricant from said reservoir for lubricating said mechanism.

7. In a power head, power transmitting mechanism comprising a beam member including a reservoir for lubricant, a pitman operatively associated with the beam member, a rotary member for actuating the pitman, means constituted by said pitman and rotary member, for supplying oil to said reservoir, and means for conveying oil from said reservoir to parts to be lubricated.

8. In a power head, power transmitting mechanism including a pivoted plunger, a hollow rocker member slidably related to said plunger, a fulcrum between the ends of said rocker, means for actuating the rocker through said fulcrum, said rocker member having an inlet opening and an outlet opening, means for supplying lubricant through said inlet opening, said plunger being adapted to close said inlet and to force oil through said outlet opening.

9. In a power head, power transmitting mechanism including a beam having an internal bore, means for supplying a lubricant to said bore, a plunger slidably movable within said bore by the normal movement of said beam, and adapted to force lubricant from said bore to said mechanism, and a movable fulcrum member between the ends of said beam, and operatively associated with the beam and plunger.

10. In a power head, the combination with a casing adapted to contain a quantity of oil, of operating mechanism mounted therein, including a drive shaft, a member operatively related to said shaft, a second member pivotally connected to said first member, one of said members being provided with an oil inlet opening and an oil outlet opening, and means associated with said members for preventing direct communication between the oil in said casing and said outlet opening.

11. In a power head, the combination with a casing adapted to contain a quantity of oil, of operating mechanism mounted therein, including a drive shaft, a member carried by said shaft and having an annular groove therein, means for conveying oil from the supply in said casing, to said groove, and means including a spring-pressed displacement plunger, associated for movement in said groove, and relative to the shaft-carried member, for displacing oil from said groove and conveying the oil to portions of said mechanism.

12. In a power head, the combination with a casing adapted to contain a quantity of oil, of operating mechanism mounted therein, including a drive shaft, a member operatively associated with said drive shaft, and having a plurality of external grooves formed therein, a second member pivotally mounted upon said first member, in adjacence with one of said grooves, a spring pressed plunger carried by said second member and engaging one of said grooves, said plunger being adapted to prevent direct communication between the oil in said casing and the other of said grooves.

13. In a power head, a rotatable driving member, means for translating the rotary movement of said member into reciprocating movement, said means including an eccentric, an eccentric strap therefor, and means carried by said eccentric and strap, and constituting therewith a fluid displacement device, means for maintaining a body of oil about an inlet portion of said device, said translating means including a rocking member of partly tubular construction forming an oil displacement chamber and a pump plunger in the displacement chamber, and operable to impel fluid to parts of the translating mechanism, and fluid conducting means between said displacement device and the chamber.

14. In a power head, power transmitting and motion translating mechanism including a rocking member of partly tubular construction forming an oil displacement chamber, means for supplying oil periodically to said chamber, a pivot element, a lever connecting said element and rocking member, and a piston element carried by said rocking member and operable therein for effecting a positive displacement of oil from said chamber, for lubrication of said pivot element.

WILLIAM H. HARSTICK.